United States Patent [19]

Greene et al.

[11] 4,097,322
[45] Jun. 27, 1978

[54] MANUFACTURE OF RIGID ELONGATE MEMBERS OF RESIN BONDED REINFORCING ELEMENTS

[75] Inventors: David James Greene, Opy; Colin Alfred Pearson, Wembley, both of England

[73] Assignee: BICC Limited, London, England

[21] Appl. No.: 765,587

[22] Filed: Feb. 4, 1977

[30] Foreign Application Priority Data

Feb. 4, 1976 United Kingdom ............... 4390/76

[51] Int. Cl.² ............................................ B65H 81/00
[52] U.S. Cl. .................................. 156/149; 156/172; 156/175; 156/180; 156/425
[58] Field of Search .............. 156/161, 165, 169, 172, 156/173, 175, 180, 206, 433, 446, 425, 148, 149, 199; 57/12, 75, 76, 7; 174/179, 178, 181; 242/7.02, 7.05 A, 7.15, 7.19, 7.21; 28/96, 101, 102

[56] References Cited

U.S. PATENT DOCUMENTS

| 2,558,855 | 7/1951 | Knewstubb et al. | 156/169 |
| 2,602,766 | 7/1952 | Francis | 156/180 |
| 3,024,302 | 3/1962 | Coggeshall | 156/148 |
| 3,260,796 | 7/1966 | Hirtzer | 156/172 |
| 3,649,401 | 3/1972 | Gunnerson | 156/175 |
| 3,929,543 | 12/1975 | Scott et al. | 156/180 |
| 3,943,020 | 3/1976 | Ashtor et al. | 156/172 |

*Primary Examiner*—David Klein
*Assistant Examiner*—Michael W. Ball
*Attorney, Agent, or Firm*—Buell, Blenko & Ziesenheim

[57] ABSTRACT

In the manufacture of a rigid elongate member of resin bonded reinforcing elements, e.g. a resin bonded glass fibre rod, reinforcing elements are passed through an apertured guide and are secured to one of two hook means spaced one vertically above the other. Elongate loops of the reinforcing elements are formed by effecting vertical to and fro movement of the guide between the hook means, as the guide approaches each hook means in turn the guide partially rotating said hook means so that the elements are wound over it. One hook means is rotatably driven with respect to the other hook means to twist the elongate loops together to form a skein in which the twisted reinforced elements are held under tension between the two hook means. The skein is then cured.

14 Claims, 4 Drawing Figures

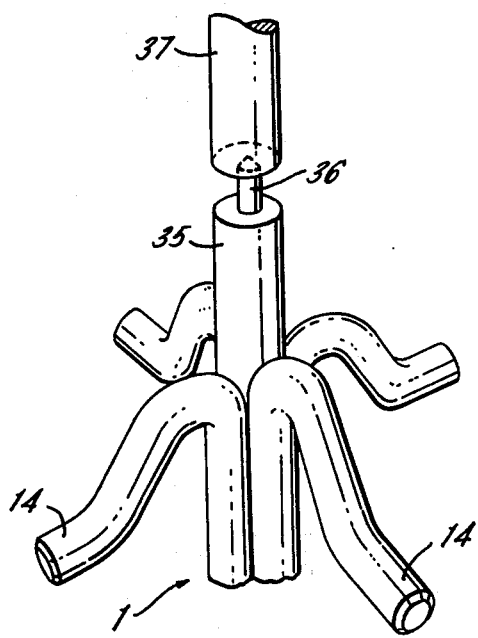

MANUFACTURE OF RIGID ELONGATE MEMBERS OF RESIN BONDED REINFORCING ELEMENTS

This invention relates to the manufacture of substantially rigid elongate members of resin bonded glass fibres or of other suitable flexible elongate reinforcing elements bonded with resin, all such glass fibres and other flexible elongate reinforcing elements hereinafter, for convenience, being included in the generic expression "reinforcing elements."

According to the present invention on an improved method of manufacturing a substantially rigid elongate member of resin bonded reinforcing elements comprises securing one end of at least one reinforcing element, that may or may not be pre-impregnated with resin, to one of two hook means spaced one substantially vertically above the other; causing the reinforcing element or elements to be wound back and forth between and over said two hook means to form a plurality of elongate loops of reinforcing elements; cutting the reinforcing element or elements and securing the free end of the element or elements to said plurality of loops or to one of said hook means; where necessary, impregnating the loops of reinforcing elements with resin; effecting relative rotation between said hook means about their common substantially vertical axis to twist the elongate loops to such an extent as to form a skein in which the helically twisted reinforcing elements are held under tension between the two hook means; and curing the skein of resin impregnated reinforcing elements to form a substantially rigid elongate member.

Preferably the hook means are removed from the substantially rigid elongate member but, in some circumstances, one or each of the hook means may be partially encapsulated in resin that is bonded to the elongate member, the hook means thereby forming a component part of the elongate member.

The outer surface of the elongate member may be ground or otherwise treated to make the surface substantially smooth.

Where two or more reinforcing elements are wound back and forth between and over the two vertically spaced hook means, the reinforcing elements may be grouped or assembled together in a bunch or strand.

Where the hook means are removed, the ends of the elongate loops of reinforcing elements at one or each end of the substantially rigid elongate member may be cut off or, if desired, the loops at one or each end of the elongate member may be retained as a means of attaching the member to a support or other body.

Manufacture of a substantially rigid elongate member of resin bonded reinforcing elements by winding a reinforcing element or group of reinforcing elements between and over two hook means spaced one substantially vertically above the other, has the important advantage that there is substantially no risk of variation in tension in the reinforcing element or elements about the neutral axis of the elongate member as they are wound between the vertically spaced hook means, which might otherwise occur where the reinforcing elements are wound between two horizontally spaced hook means. Since by the method of the present invention there is substantially no variation in tension in the reinforcing elements throughout the length of the elongate member, there is less tendency for distortion of the elongate member to occur when the member is supported horizontally.

Preferably, the elongate loops in which the reinforcing element or bunch or strand of reinforcing elements is wound are arranged in two or more groups which are circumferentially spaced around the common substantially vertical axis of the hook means. Preferably, this arrangement is achieved by employing hook means having two or more hooks circumferentially spaced around said common axis and by effecting about said axis partial relative rotational movement between each hook means and the reinforcing element or bunch or strand of reinforcing elements as it approaches the hook means in such a way that each hook means, successive loops of the reinforcing element or elements are wound over successive hooks. Such partial relative rotational movement is preferably effective by arranging for the reinforcing element or bunch or strand of reinforcing elements to travel in a direction substantially parallel to the common axis of the hook means and, as it approaches a hook means, partially rotating the hook means about its axis to such an extent that, when the reinforcing element or bunch or strand of reinforcing elements has passed the hook means and is caused to travel in the opposite direction, it will be looped around one of the hooks of the hook means.

Usually, the substantially rigid elongate member made by the method of the present invention will be a rod of substantially solid transverse cross-section but, if desired, the method may be employed to make a substantially rigid tubular member of resin bonded reinforcing elements or to apply a layer of resin bonded reinforcing elements to an elongate former.

Preferably a substantially rigid tubular member of resin bonded reinforcing elements is made by detachably securing a removable elongate mandrel between and along the common axis of the two vertically spaced hook means, the mandrel being so connected to at least one hook means that the hook means can rotate about its axis relative to the mandrel. In this case, when relative rotation is effected between the two hook means, the elongate loops of reinforcing elements are helically twisted about the elongate mandrel which is removed after the twisted loops of reinforcing elements have been cured. This mandrel may be of circular or non-circular transverse cross-section.

In applying a layer of resin bonded reinforcing elements to an elongate former, the former is detachably secured between and along the common axis of the two vertically spaced hook means and is so connected to at least one of the hook means that the hook means can rotate about its axis relative to the former. When relative rotation is effected between the two hook means, the elongate loops of reinforcing elements are helically twisted about the elongate former. When the twisted loops of reinforcing elements are cured, they adhere to and form a substantially rigid reinforcing layer on the former. The elongate former, which may be of circular or non-circular transverse cross-section, may be a substantially rigid elongate member or it may be a flexible elongate member, such as a cord, the part of the flexible former enclosed by the twisted loops of reinforcing elements being rendered substantially rigid when the reinforcing elements are cured.

Relative rotation between the two hook means to twist the elongate loops of reinforcing elements may be effected either by maintaining one of the hook means stationary and rotating the other about its axis or by rotating the two hook means in opposite directions.

The invention also includes apparatus for use in manufacturing a substantially rigid elongate member of resin bonded reinforcing elements by the method described above, which apparatus comprises two hook means spaced one substantially vertically above the other, one or each of the hook means being so mounted that it is rotatable about their common axis; and apertured guide for the passage of at least one reinforcing element, which guide is transversely spaced from the common axis of said hook means; means associated with the apertured guide and/or with the hook means for effecting relative substantially vertical movement between the guide and the vertically spaced hook means in such a way that, in effect, the guide can be caused to travel between one hook means and the other; and means for effecting about the common axis of the hook means partial relative rotation between each hook means and the apertured guide as the apertured guide approaches said hook means, the arrangement being such that a reinforcing element or bunch or strand of reinforcing elements passing through the apertured guide and secured to one of the two hook means can be arranged in a plurality of elongate loops extending between the two hook means by effecting relative substantially vertical movement between the guide and the two hook means and, as the guide approaches each hook means in turn, effecting partial relative rotation between said hook means and the guide and being such that, when relative rotational movement is effected between the two hook means, the elongate loops can be twisted about the common axis of the hook means to form a skein in which the helically twisted reinforcing elements will be held under tension between the two hook means.

Preferably, each hook means comprises two or more hooks circumferentially spaced around the common axis of the two hook means and in a preferred embodiment each hook means comprises four hooks circumferentially spaced at uniform intervals. Preferably, also, each hook means is adapted to be freely rotatable about the common axis of the two hook means and the apertured guide carries cam means which is so shaped and positioned as to engage a hook or other part of the hook means as the guide approaches the hook means to effect partial rotation of the hook means about the common axis with respect to the guide in such a direction and to such an extent that when the guide, which has travelled past the hook means, is caused to travel in the opposite direction the reinforcing element or elements will be wound over the hook.

The two hook means are preferably so supported as to be mounted stationary in space and the apertured guide is so supported that it can be caused to travel to and fro between the two hook means in a direction substantially parallel to the common axis of the hook means. The apertured guide preferably comprises substantially vertical plate carrying at its upper and lower ends cam means for effecting partial rotation of the two hook means and having, between its ends, an aperture for passage of a reinforcing element or of a bunch or strand of reinforcing elements.

The invention is further illustrated by a description, by way of example, of the preferred apparatus for and method of manufacturing a substantially rigid elongate member of resin bonded glass fibre with reference to the accompanying drawings, in which:

FIG. 4 is a fragmental perspective view of a modified lower hook means of the apparatus.

Figure 1:
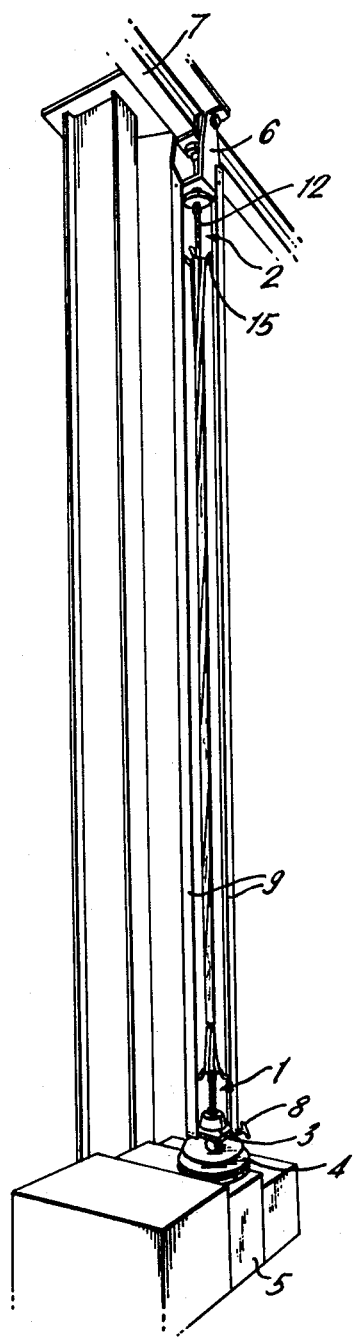
FIG. 1 is a general perspective view of the apparatus, with parts omitted.
Figure 2:
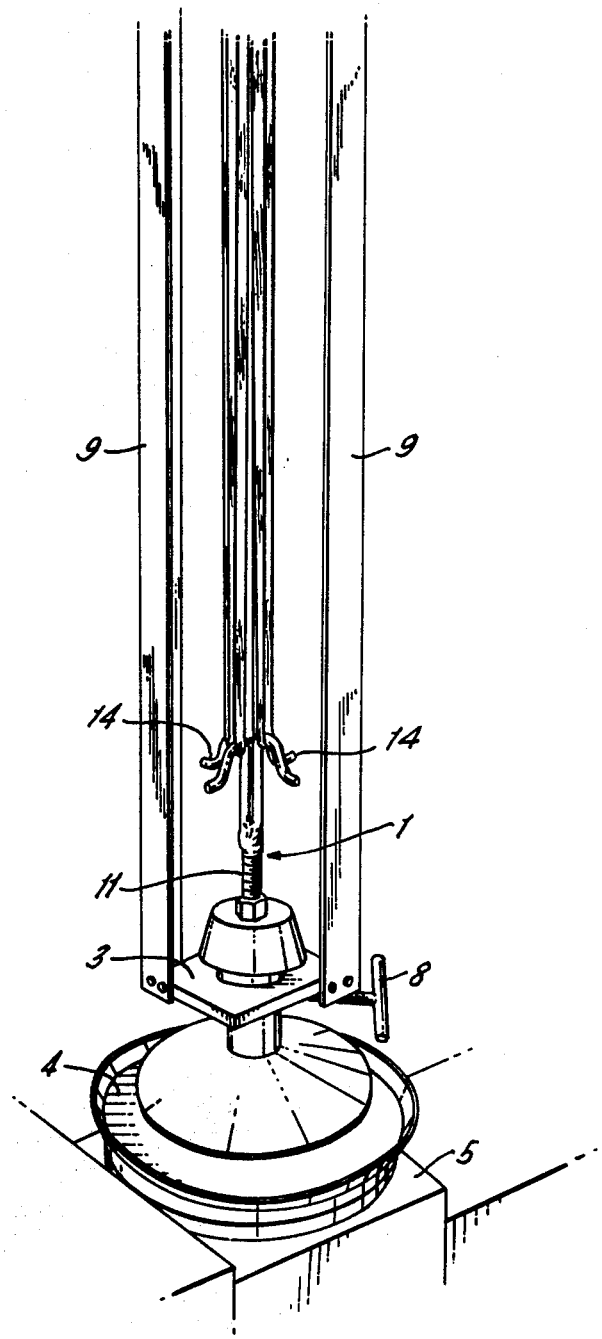
FIG. 2 is a fragmental perspective view of the lower end of the apparatus shown in FIG. 1, drawn on a larger scale.
Figure 3:
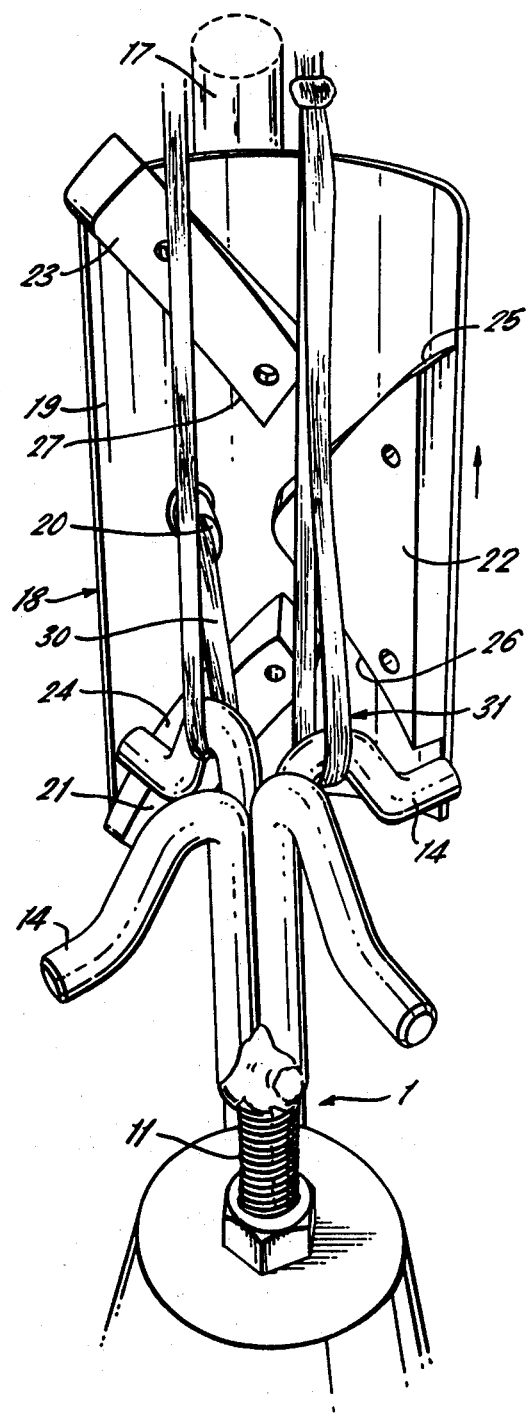
FIG. 3 is a detailed perspective view of the lower hook means and apertured guide of the apparatus drawn on an even larger scale.

In the apparatus shown in FIGS. 1 to 3 two hook means 1 and 2 are so supported so to be spaced one vertically above the other, the lower hook means being mounted on a platform 3 carried by a turntable 4 which can be rotatably driven about the common axis of the hook means by a motor 5 and the upper hook means 2 being suspended from a bracket 6 depending from a girder 7. The hook means 1 is so mounted on the platform 3 that it is freely rotatable about the common axis of the two hook means, a key 8 being provided to enable the hook means 1 to be locked with respect to the platform when required; the hook means 2 is so mounted on the bracket 6 that it is freely rotatable about the common axis in an anti-clockwire direction (viewed from above), a ratchet (not shown) being provided to prevent rotation in the opposite direction. Lengths 9 of angle iron rigidly interconnecting the platform 3 and the bracket 6 serve to prevent twisting of the platform and bracket when relative rotation is effected between the hook means 1 and 2. The hook means 1 comprises a central boss 11 from which upstand four circumferentially spaced hooks 14; the hook means 2 comprises a central boss 12 from which depend four circumferentially spaced hooks 15.

Extending vertically alongside and transversely spaced from the common axis of the vertically spaced hook means 1 and 2 is a shaft 17 (FIG. 3) on which is mounted an apertured guide 18 for the passage of a strand of resin bonded glass fibres. The apertured guide 18 is caused to travel up and down the shaft 17 in a linear direction parallel to the common axis of the hook means 1 and 2 by means of a reversible chain drive (not shown). The apertured guide 18 comprises a vertical arcuate-shaped plate 19 having an aperture 20 for the passage of a strand of resin impregnated glass fibre. Secured to the plate 19 are three cams 21, 22 and 23, the cam 21 having a cam surface 24, the cam 22 having cam surfaces 25 and 26 and the cam 23 having a cam surface 27. As will be explained, as the apertured guide 18 travels downwardly past the lower hook means 1, cam surfaces 26 and 27 engage one of the hooks 14 to cause partial rotation of the hook means and, as the apertured guide travels upwardly past the upper hook means 2, cam surfaces 25 and 24 engage one of the hooks 15 to cause partial rotation of the hook means.

In operation, a strand 30 of resin impregnated glass fibres is threaded through the aperture 20 of the apertured guide 18 and a loop 31 formed at the free end of the strand is slipped over one of the hooks 14 of the lower hook means 1. The chain drive is now driven in such a direction as to cause the guide 18 to travel upwardly towards the upper hook means 2, the strand 30 being fed through the aperture 20 and extending alongside the common axis of the hook means during upward travel of the guide. As the guide reaches the upper hook means 2, the cam surface 25 engages one of the hooks 15 of the upper hook means and partially rotates the hook means 2 in an anti-clockwise direction (viewed from above) and the cam surface 24 then engages the same hook to cause further rotation of the hook means so that the hook is passed from one side of the strand to the other. When the guide 18 is beyond the hook means 2, the direction of drive of the chain drive is reversed so that the guide commences to travel downwardly, as it does so the strand 30 being looped over the hook.

As the guide 18 approaches the lower hook means 1 the cam surface 26 engages one of the hooks 14 of the lower hook means and partially rotates the hook means in an anti-clockwise direction (viewed from above) and the cam surface 27 then engages the same hook to cause further rotation of the hook means so that the hook is passed from one side of the strand to the other. When the guide 18 is beyond the hook means 1, the direction of drive of the chain drive is reversed so that the guide commences to travel upwardly, as it does so the strand being looped over the hook. This sequence of operations is repeated so that, at each hook means, the strand 30 is looped over successive hooks until the required number of elongate loops of the strand of resin impregnated glass fibres extend between the hook means 1 and 2. The strand 30 is then cut and the free end secured to a hook of one of the hook means.

The hook means 1 is now locked to the turntable 4 and, with rotation of the hook means 2 prevented by the ratchet (not shown), the hook means 1 is rotatably driven in an anti-clockwise direction (viewed from above) about the common axis of the hook means by the motor 5 until the skein is formed in which the helically twisted elongate loops of strand are held under tension between the two hook means. The hook means 1 is then locked to the platform 3 by the key 8, the platform is disconnected from the motor 5 and turntable 4 and the assembly conveyed to an oven where the skein of resin impregnated glass fibres is cured to form a substantially rigid rod. After removal from the oven, the hook means are removed and, if desired, the loops formed at the ends of the rod are cut off. The outer surface of the rod may be ground or otherwise treated to make it substantially smooth if desired.

Where it is required to make a substantially rigid rod of tubular cross-section, a removable mandrel may be employed which is mounted between the upper and lower hook means in such a way that each hook means can rotate with respect to the mandrel. As will be seen on referring to FIG. 4, in this case the lower hook means 1 will have an upstanding stud 35 supporting a pivot 36 by means of which a removable mandrel 37 can be rotatably mounted with respect to the hook means. The upper hook means 2 will have a similar pivot arrangement for the mandrel.

In some circumstances, the removable mandrel 37 may be replaced by an elongate former around which the elongate loops of resin impregnated glass fibre will be twisted and which will form a core element of the substantially rigid member being manufactured.

What we claim as our invention is:

1. A method of manufacturing a substantially rigid elongate member of resin bonded reinforcing elements which comprises:
    (a) feeding at least one resin impregnated reinforcing element through an apertured guide, which guide is transversely spaced from the common axis of two hook means each mounted stationary in space with one substantially vertically above and spaced from the other and each rotatable about their common axis, and securing one end of the reinforcing element to one of said two hook means;
    (b) causing the apertured guide to travel in a direction substantially parallel to the common axis of said hook means to and beyond one hook means, the guide engaging and effecting partial rotation of the hook means about said common axis with respect to the guide as the guide approaches the hook means, reversing the direction of travel of the guide to wind the reinforcing element over the hook means, and repeating the aforesaid steps at each hook means alternately to form a plurality of elongate loops of reinforcing elements;
    (c) cutting the reinforcing element and securing the free end of the element to one of said plurality of loops and one of said hook means;
    (d) rotatably driving at least one of said hook means with respect to the other hook means about their common substantially vertical axis to twist the elongate loops to such an extent as to form a skein in which the helically twisted resin impregnated reinforcing elements are held under tension between the two hook means; and
    (e) curing the skein of resin impregnated reinforcing elements to form a substantially rigid elongate member.

2. A method as claimed in claim 1, wherein the hook means are removed from the substantially rigid elongate member.

3. A method as claimed in claim 2, wherein the loops at at least one end of the elongate member are retained as a means of attaching the member to another body.

4. A method as claimed in claim 1, wherein at least one of the hook means is partially encapsulated in resin that is bonded to the elongate member, the hook means thereby forming a component part of the elongate member.

5. A method as claimed in claim 1, in which at least two resin impregnated reinforcing elements are wound back and forth between and over the two vertically spaced hook means, wherein the reinforcing elements are assembled together in a bunch.

6. A method as claimed in claim 1, wherein the elongate loops in which the reinforcing element is wound are arranged in at least two groups which are circumferentially spaced around the common substantially vertical axis of the hook means.

7. A method as claimed in claim 6, wherein each hook means has at least two hooks circumferentially spaced around the common substantially vertical axis of the hook means and wherein partial rotational movement about said axis of each hook means as the guide approaches said hook means is effected in such a way that, at each hook means, successive loops of the reinforcing element are wound over successive hooks.

8. A method as claimed in claim 1, wherein the outer surface of the elongate member is ground to make the surface substantially smooth.

9. A method as claimed in claim 1, wherein the method is modified in that the reinforcing element being secured to one of said two hook means and being wound back and forth between and over said two hook means is unimpregnated and the elongate loops of reinforcing elements are impregnated with resin after they have been wound and before they are twisted together.

10. A method of manufacturing a substantially rigid elongate member of resin bonded reinforcing elements which comprises:

(a) feeding at least one resin impregnated reinforcing element through an apertured guide, which guide is transversely spaced from the common axis of two hook means which are mounted stationary in space with one substantially vertically above and spaced from the other and are rotatable about their common axis and between which hook means is detachably secured an elongate former that extends along said common axis and is so connected to at least one of the hook means that the hook means can rotate about its axis relative to the former, and securing one end of the reinforcing element to one of the hook means;

(b) causing the apertured guide to travel in a direction substantially parallel to the common axis of said hook means to and beyond one hook means, the guide engaging and effecting partial rotation of the hook means about said common axis with respect to the guide as the guide approaches the hook means, reversing the direction of travel of the guide to wind the reinforcing element over the hook means, and repeating the aforesaid steps at each hook means alternately to form a plurality of elongate loops of reinforcing elements;

(c) cutting the reinforcing element and securing the free end of the element to one of said plurality of loops and one of said hook means;

(d) rotatably driving at least one of said hook means with respect to the other hook means about their common substantially vertical axis to twist the elongate loops to such an extent as to form a skein in which the helically twisted resin impregnated reinforcing elements are held under tension between the two hook means; and (e) curing the skein of resin impregnated reinforcing elements to form a substantially rigid elongate member.

11. A method of manufacturing a substantially rigid elongate member of resin bonded reinforcing elements which comprises:

(a) feeding at least one resin impregnated reinforcing element through an apertured guide, which guide is transversely spaced from the common axis of two hook means which are mounted stationary in space each one substantially vertically above and spaced from the other and are rotatable about their common axis and between which hook means is detachably secured an elongate former that extends along said common axis and is so connected to at least one of the hook means that the hook means can rotate about its axis relative to the former and securing one end of the reinforcing element to one of the hook means;

(b) causing the apertured guide to travel in a direction substantially parallel to the common axis of said hook means to and beyond one hook means, the guide engaging and effecting partial rotation of the hook means about said common axis with respect to the guide as the guide approaches the hook means, reversing the direction of travel of the guide to wind the reinforcing element on the hook means, and repeating the appropriate steps at each hook means alternately to form a plurality of elongate loops of reinforcing elements;

(c) cutting the reinforcing element and securing the free end of the element to one of said plurality of loops and one of said hook means;

(d) rotatably driving at least one of the said hook means with respect to the other hook means about their common substantially vertical axis to twist the elongate loops about the elongate former to such an extent as to form around the former a skein in which the helically twisted resin impregnated reinforcing elements are held under tension between the two hook means; and (e) curing the skein of resin impregnated reinforcing elements to cause the twisted loops of reinforcing elements to adhere to the former and form a substantially rigid elongate member.

12. A method as claimed in claim 11, wherein the elongate former is a flexible elongate member, the part of the flexible former enclosed by the twisted loops of reinforcing elements being rendered substantially rigid when the reinforcing elements are cured.

13. A method of manufacturing a substantially rigid elongate tubular member of resin bonded reinforcing elements which comprises:

(a) feeding at least one resin impregnated reinforcing element through an apertured guide, which guide is transversely spaced from the common axis of two hook means which are mounted stationary in space with one substantially vertically above and spaced from the other and are rotatable about their common axis and between which hook means is detachably secured a substantially rigid elongate mandrel that extends along said common axis and is so connected to at least one of the hook means that the hook means can rotate about its axis relative to the mandrel, and securing one end of the reinforcing element to one of the hook means;

(b) causing the apertured guide to travel in a direction substantially parallel to the common axis of said hook means to and beyond one hook means, the guide engaging and effecting partial rotation of the hook means about said common axis with respect to the guide as the guide approaches the hook means, reversing the direction of travel of the guide to wind the reinforcing element over the hook means, and repeating the aforesaid steps at each hook means alternately to form a plurality of elongate loops of reinforcing elements;

(c) cutting the reinforcing element and securing the free end of the element to one of said plurality of loops and one of said hook means;

(d) rotatably driving at least one of said hook means with respect to the other hook means about their common substantially vertical axis to twist the elongate loops about the elongate mandrel to such an extent as to form around the mandrel a skein in which the helically twisted resin impregnated reinforcing elements are held under tension between the two hook means;

(e) curing the skein of resin impregnated reinforcing elements to cause the twisted loops of reinforcing elements to form a substantially rigid reinforcing layer on the mandrel; and (f) removing the mandrel to form a substantially rigid elongate tubular member.

14. A method as claimed in claim 13, wherein the elongate mendrel is of non-circular transverse cross-section.

* * * * *

UNITED STATES PATENT OFFICE
CERTIFICATE OF CORRECTION

Patent No. 4,097,322  Dated June 27, 1978

Inventor(s) David James Greene and Colin Alfred Pearson

It is certified that error appears in the above-identified patent and that said Letters Patent are hereby corrected as shown below:

Column 4, line 12, "so" (second occurrence) should be --as--.

Claim 14, line 66, "mendrel" should be --mandrel--.

Signed and Sealed this

Twenty-sixth Day of December 1978

[SEAL]

Attest:

RUTH C. MASON
Attesting Officer

DONALD W. BANNER
Commissioner of Patents and Trademarks